United States Patent [19]  [11] 4,137,704
Schreyer  [45] Feb. 6, 1979

[54] COUPLING SHACKLE

[75] Inventor: Kenneth D. Schreyer, Clarence, N.Y.

[73] Assignee: Columbus McKinnon Corporation, Tonawanda, N.Y.

[21] Appl. No.: 833,738

[22] Filed: Sep. 16, 1977

[51] Int. Cl.² ............................................. F16G 15/06
[52] U.S. Cl. ........................................... 59/86; 59/93
[58] Field of Search .................. 59/85, 93, 35 CP, 78, 59/84, 86, 88, 91

[56] References Cited

U.S. PATENT DOCUMENTS

| 620,914 | 3/1899 | Griffith | 59/86 |
|---|---|---|---|
| 3,950,941 | 4/1976 | Ohrn | 59/86 |
| 3,974,640 | 8/1976 | Schreyer | 59/85 |
| 4,063,413 | 12/1977 | Benton | 59/85 |

Primary Examiner—C.W. Lanham
Assistant Examiner—Gene P. Crosby

[57] ABSTRACT

A coupling shackle for field/factory assembly of lengths of chain, rope, cables, or the like/or attachments thereto; said coupling shackle comprising a generally U-shaped unit comprising an overlay/underlay assembly of two or more relatively nested complemental-configured U-shaped members which are traversed and interconnected at their leg ends as by means of a bolt or pin or the like. Said members may be first stamped or otherwise cut out of sheet/plate stock and then bent into U-shaped configurations; the bowed intermediate portions thereof being subsequently U-shape sectionally formed. The open end leg portions at opposite sides of the unit are apertured and side-by-side mounted upon the structurally cooperating interconnecting bolt or pin. Preferably, a bearing sleeve member embraces the bolt or pin intermediately of the legs of the U-shaped members; the sleeve member being of outside-diameter-stepped-down form at its opposite ends so as to accommodate thereon said leg portions which are formed with differently shaped successively smaller diameter apertures. Thus, when the shackle is under tension loadings the bowed portions of contiguous members yield into mutually reinforcing shapes; and the loadings thereon are transmitted to the bolt or pin member in such manner as to reduce the shear stress concentrations thereon.

9 Claims, 10 Drawing Figures

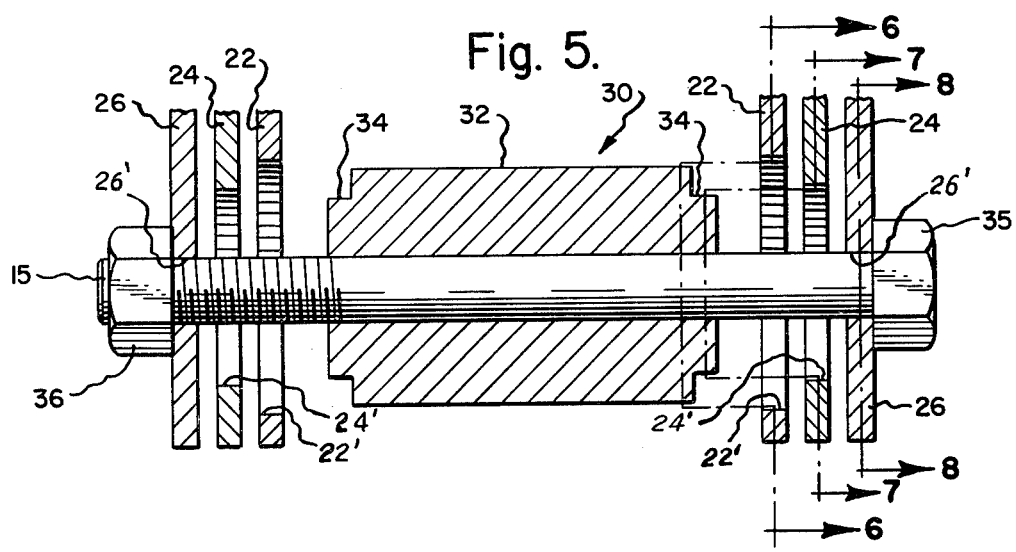
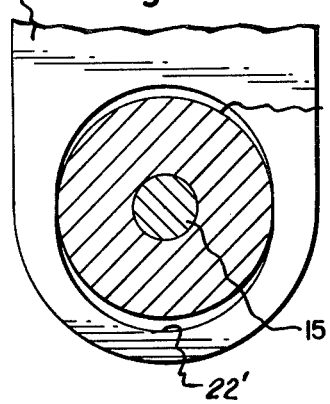 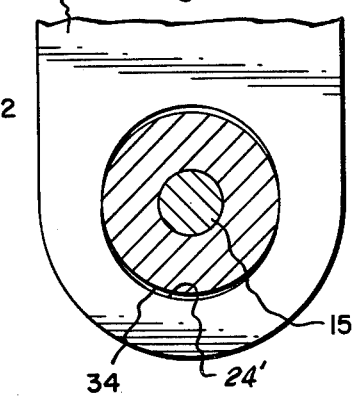 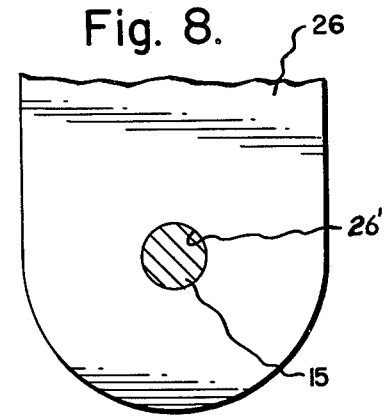
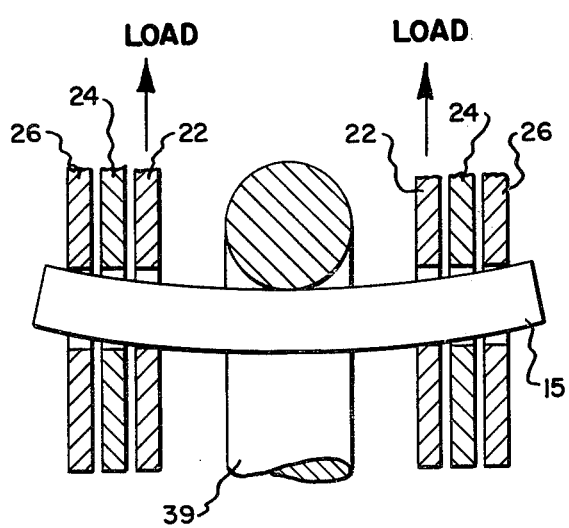 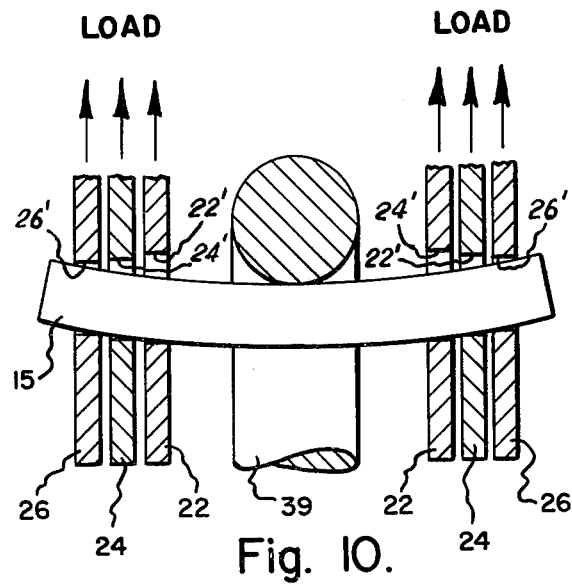

COUPLING SHACKLE

BACKGROUND OF THE INVENTION

This invention relates to improvements in coupling shackles, such as are adapted for use in the field or shop to interconnect lengths of chain, cable, rope, or the like; and accessories or other items thereto. A variety of shackle arrangements which have been previously proposed for such purposes are disclosed for example in U.S. Pat. Nos. 3,104,519; 3,373,560; 3,453,822 and 3,846,978. It is to be noted that such prior art shackles are typically constructed in the form of metal forgings, as distinguished from the present invention which employs a laminate of stamped and formed sheet or plate stock pieces.

OBJECTS AND ADVANTAGES OF THE INVENTION

The prime object of the present invention is to provide a shackle which is not only as strong and durable as are shackles of the prior art; but which also is much less expensive to manufacture and is of lighter weight. When operating under load, the lamina of the bowed end portion of the shackle relatively adjust their load carrying parts in novel manner in accordance with their own configurations as well as to those of the load carrying devices to which it is connected. Thus, compared to shackles of the prior art, the bowed end portions of the shackles of the present invention avoid with improved facility imposition of stress risers and/or concentrations upon the devices to which they are connected, as well as upon the shackle structure, per se. Also, the leg interconnecting pin and sleeve combination of the present invention provides an improved arrangement of load carrying parts whereby the unit shear loads on the pin member are reduced, and whereby requisite material specifications for the apertured leg portions of the U-shaped members are reduced.

THE DRAWING

By way of example, the preferred embodiment of the invention is illustrated by the accompanying drawing, wherein:

FIG. 5 is a fragmentary, enlarged scale sectional view, of a portion of FIG. 4;

FIGS. 6, 7, 8 are sectional views taken as suggested by lines 6, 7, 8 respectively, at FIG. 5; and FIGS. 9, 10 are exaggerated schematic illustrations showing how tension load stresses are accommodated by the members of the shackle of the invention in improved manner.

Figure 1:
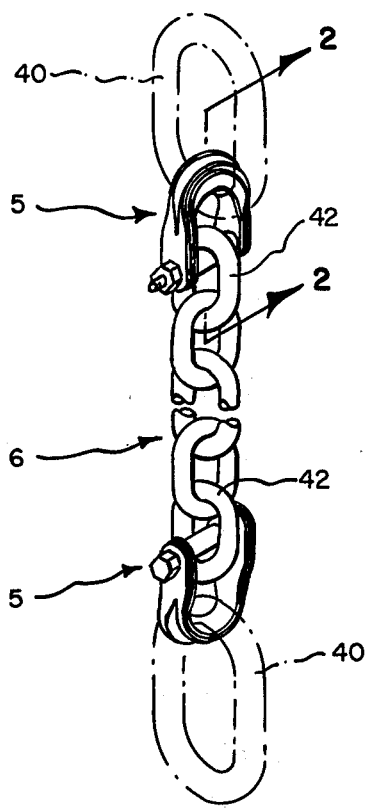
FIG. 1 is a fragmentary perspective view; showing use of a pair of shackles of the present invention in connection with a typical load carrying chain assembly.

As illustrated by FIG. 1 of the drawing herewith, shackle devices of the present invention identified generally by the numerals 5—5 may be employed in connection with a single load chain 6. Further by way of example, the shackles 5—5 are also shown as being used to interconnect load carrying chain links 40—40 and links 42—42 of standard type load carrying chain assemblies.

Figure 4:
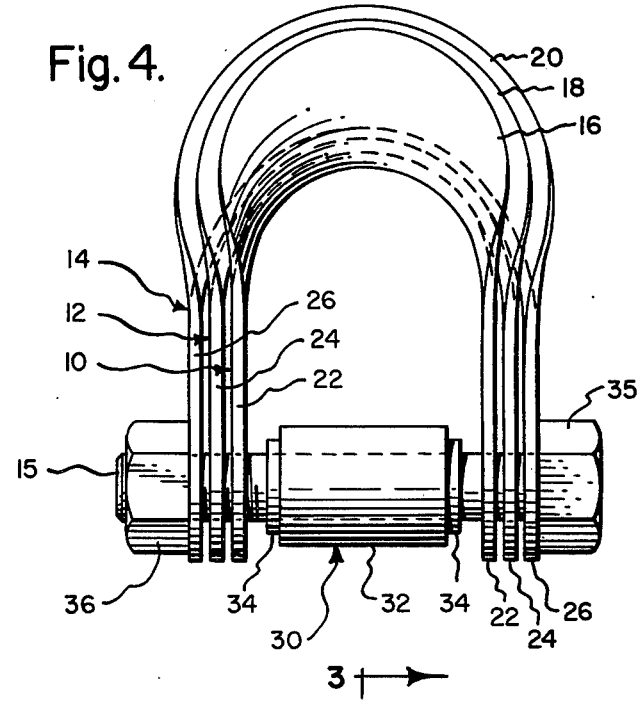
FIG. 4 is an elevational view of the shackle parts just prior to final assembly thereof into the form shown in FIG. 2.
Figure 3:
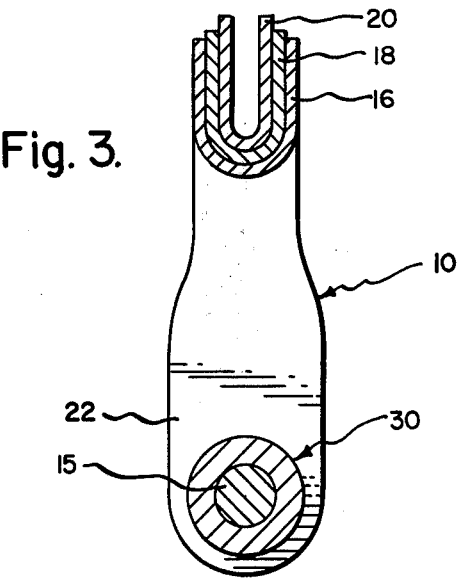
FIG. 3 is a section taken as suggested by line 3—3 of FIG. 2.

Also as illustrated herein, the shackle of the invention may include by way of example three generally U-shaped (in plan view) members which are respectively designated by the numerals 10, 12, 14; and which are interconnected by a load carrying bolt or pin 15. The members 10, 12, 14 are secondarily formed throughout their intermediately bowed portions 16, 18, 20 into mutually complementing U-shaped sectional configurations (FIG. 3) while terminating in flat, parallel disposed leg portions 22, 24, 26, respectively (FIG. 4). The leg portions 22, 24 and 26 are formed with apertures 22', 24' and 26', respectively to receive the pin 15 and a spacer bearing sleeve 30, thus providing for assembly of the device as will be described more fully hereinafter.

Figure 2:
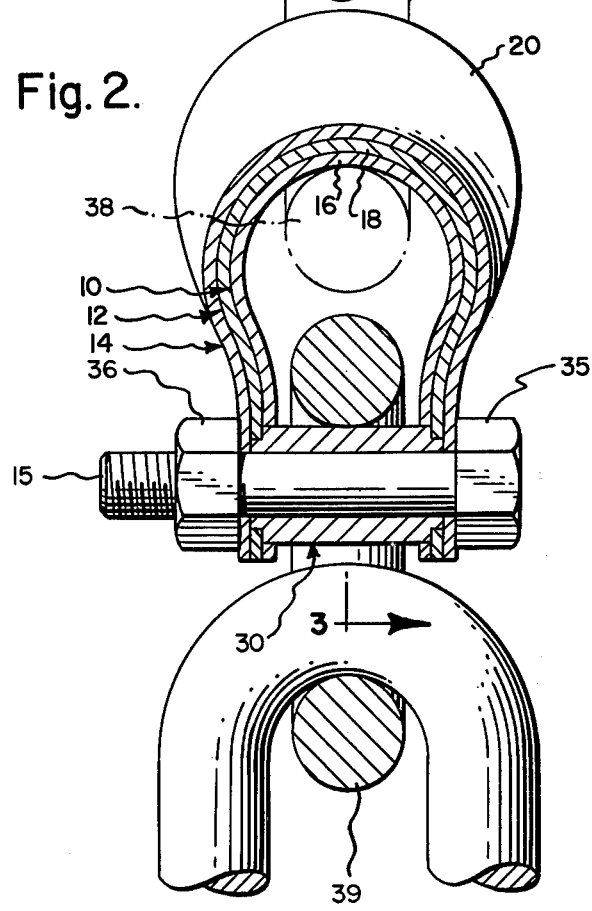
FIG. 2 is an enlarged scale parti-sectional view as suggested by line 2—2 of FIG. 1, showing a shackle of the present invention in engagement with a load chain.

The bearing sleeve 30 is externally diametered generally as illustrated at 32 so as to slide-fit into the apertured leg portions 22—22 of the innermost member 10, and is shouldered at its opposite ends as indicated at 34—34 to reduced diameter dimensions so as to be adapted to slip-fit into the apertured leg portions 24—24 of the intermediate member 12. The leg portions 26—26 of the outermost member 14 are apertured so as to slip-fit engage upon the shank of the bolt 15; and thus it will be understood that the components of the shackle of the invention may be initially relatively assembled as illustrated at FIGS. 4, 5. As shown therein, the pin 15 is headed at one end 35 and is threaded at its opposite end so as to accommodate a threaded nut thereon as shown at 36. Subsequent to preliminary assembly of the device as shown at FIGS. 4–5, the nut 36 is adjusted on the pin 15 so as to compact the shackle assembly against the ends of the spacer sleeve 30 in finally assembled condition as illustrated at FIGS. 1–2 of the drawing herewith.

It is to be understood that the holes through the leg portions 22, 24, 26, of the assembly for receiving the pin 15 may be formed by any suitable shop practices such as by drilling, punching, or the like. Also, whereas the drawing herewith illustrates a form of shackle device of the invention wherein three internested members are employed, it is to be understood that any other preferred number of internesting members may be employed.

An important aspect of the invention resides in the fact that the U-shaped portion of the shackle comprises a laminate of strap-like members which substantially throughout the bowed portions thereof are U-shaped, both when viewed in elevation and in section; and which internest in complementing configurations substantially throughout their bowed portions. Preferably, these members will be formed of somewhat shape-yieldable, high tensile strength, sheet or platelike stock. In some instances the prerequisites will call for use of steel or other metal as the stock material; but it is to be understood that the invention is also applicable to use of other materials such as plastics, etc. In any case it is by virtue of this arrangement that the bowed portions of the individual lamina are adapted to systematically adjust into mutually cooperating configurations when under a large variety of service loading conditions; thereby equalizing the distribution of load responsive tension/bending/shear forces throughout the entire structure of the shackle device.

More specifically, it will thus be apparent that when the bowed portions of the members are subjected to load stresses such as by connections to load carrying chain links or the like as indicated at 38, 39 (FIG. 2); the stresses on the bowed portions of the individual members will be minimized by reason of the capabilities of those sections of the device to adapt configuration-wise in improved manner to each other, as well as to the shape of the load transmitting device 38 to which the shackle is coupled. Such accommodations are accomplished by virtue of widespread distribution of the loadings throughout the structure; whereby a lesser amount (and weight) of metal is required in the construction of a shackle of the present invention to meet safety performance specifications, than in the case of shackle devices of the prior art. Also, by virtue of this same performance characteristic the shackle device of the present invention operates to minimize stress "spot" concentrations on parts of the load carrying devices to which it is coupled, to their strength/wear resistance advantages.

Furthermore, because the leg portions 22, 24, 26, of the device of the invention separately apply in spread-apart relation only fractional portions of the overall service loadings upon the pin 15, it is therefor required to withstand substantially lower shear loadings at any one section thereof compared to the shear resistance requirements for corresponding pins of prior art shackle devices.

Inasmuch as the innermost members of the laminate assembly usually take the initial stresses when coming under load and are therefor required to shape-yield somewhat until backed up by the intermediate/outermost members, it may be preferred to make the inner members of the assembly from somewhat thicker stock materials than are used for the outer members so as to avoid premature tensile failures of the inner members, and to provide an improved cooperation between the inner and outer members, to gain maximum operating strength vs weight advantages for the entire unit.

Another important feature of the invention contemplates that whereas the shackle bolt (or pin) inevitably undergoes some degree of "beam" bending (however minor) when under load, this action imposes unequal loadings upon the members of the laminate if the apertures through the members are formed to dimensionally complement the diameters of corresponding sections of the pin. FIG. 9 illustrates (in exaggerated manner) how the bearing pin 15 as a unit tends to deflect under loadings, whereby if the apertures through the leg members 22, 24, 26 were to be dimensioned so as to consistently conform to the diameters of corresponding portions of the pin 15, the legs 22—22 of the innermost member 10 would carry all of the load while the legs 24—24 and 26—26 would be relatively relaxed. Accordingly, as shown at FIG. 8, only the legs 26—26 of the outermost member are cylindrically apertured to closely fit upon the pin 15, while the legs 24—24 of the intermediate member are ovally apertured as shown at 24' (FIG. 7); and the legs 22—22 of the inner member are more ovally apertured as shown at 22' (FIG. 6). As indicated in FIGS. 6, 7 and 10, the lengthwise dimension or longitudinal axis of apertures 22' and 24' extend lengthwise of leg portions 22 and 24. Also, the lengthwise dimension of apertures 22' and 24' may be considered to be co-directional with the loading indicated by the arrows in FIGS. 9 and 10 in that the shape of the present shackle, including the rounded surfaces of sleeve 30 and bowed portion 16, permit the shackle to orient or align itself relative to the end applied loading conditions illustrated in FIGS. 1 and 2. By reason of this arrangement the members 22, 24, 26 are substantially equally stressed when the shackle is under load.

I claim:

1. In a shackle device comprising an interfitting laminate including inner and outer generally U-shaped members each having bowed intermediate portions extending from generally parallel leg portions formed with apertures disposed in transversely aligned relation, and a connecting pin slide fitted through said apertures to complete said shackle device, the improvement comprising in combination:

a spacer sleeve mounted on a mid-portion of said pin for opposite end engagement with the leg portions of said outer member, said spacer sleeve extending through the apertures of the leg portions of said inner member.

2. The improvement according to claim 1, wherein said laminate includes at least one intermediate U-shaped member, said spacer sleeve is shouldered to a reduced diameter at its opposite ends to define a step profile form and the apertures of the leg portions of said intermediate and inner members are sized complimentary to said step profile form.

3. The improvement according to claim 2, wherein said apertures of said leg portions of said intermediate and inner members are elongated in a direction lengthwise of their associated leg portions.

4. The improvement according to claim 2, wherein said pin and said spacer sleeve are of circular cross-section, and the apertures of said leg portions of said outer member are of circular form and sized complimentary to the diameter of said pin, said apertures of said leg portions of said intermediate and inner members are of oval form elongated in a direction extending lengthwise of their associated leg portions.

5. In a shackle device comprising an interfitting laminate including at least inner and outer generally U-shaped members each having bowed intermediate portions extending from generally parallel leg portions formed with apertures disposed in transversely aligned relation, and a connecting pin slide-fitted through said apertures thereby providing a complete shackle device, the improvement comprising in combination:

said pin being of circular cross-section, the apertures formed in the leg portions of said outer member being of circular form sized complimentary to the diameter of said pin and the apertures of the leg portions of said inner member being elongated relative to said apertures of said leg portions of said outer member in a direction extending lengthwise of said leg portions of said inner member.

6. The improvement according to claim 5, wherein said laminate includes at least one intermediate U-shaped member having its leg portions formed with elongated apertures whose lengthwise dimensions are sized intermediate the dimensions of said apertures of said leg portions of said inner and outer members, as measured lengthwise of said leg portions of said outer, intermediate and inner members.

7. In a shackle device comprising interfitting laminate including inner and outer generally U-shaped members each having bowed intermediate portions extending from generally parallel leg portions formed with apertures disposed in transversely aligned relation, and load carrying means slide-fitted through said apertures to complete said shackle device, the improvement comprising in combination:

said load carrying means having its cross-sectional size reduced stepwise adjacent opposite ends thereof, said apertures of the leg portions having their sizes increased stepwise in a direction towards said inner member and being complimentary to contiguous cross-sectional sizes of said load carrying means.

8. An improvement according to claim 7, wherein said load carrying means is of circular cross-section, said apertures in the leg portions of said outer member are of circular form and said apertures in the leg portions of said inner member are elongated in a direction extending lengthwise of their associated leg portions.

9. An improvement according to claim 8, wherein said laminate includes at least one intermediate U-shaped member, the apertures of the leg portions of said intermediate and inner members are of oval form and the lengthwise dimension of said apertures of said inner member exceed the lengthwise dimension of apertures of said intermediate member.

* * * * *